Dec. 29, 1925.

E. CRAIG 1,567,425

PAIL MAKING MACHINE

Filed Jan. 4, 1924    15 Sheets-Sheet 1

Inventor:
Edward Craig
Arthur F. Durand Atty.

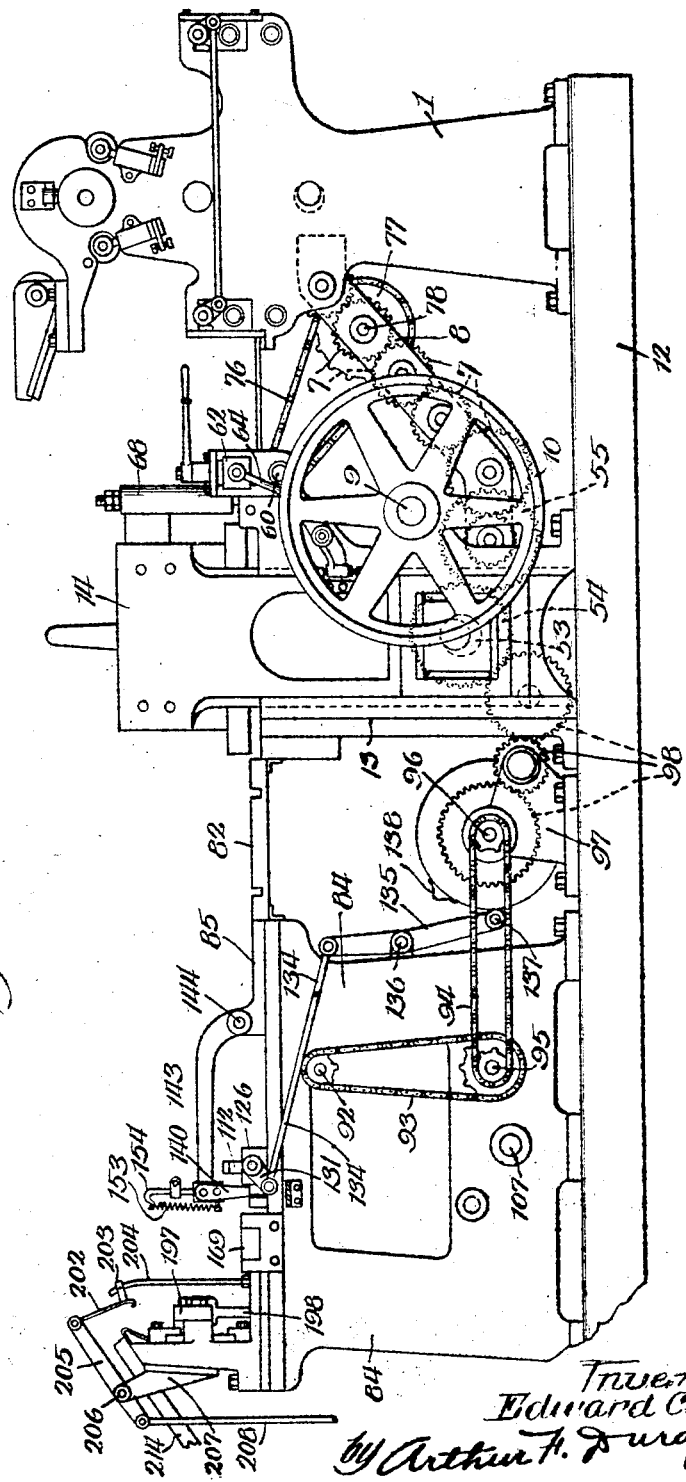

Dec. 29, 1925.

E. CRAIG 1,567,425

PAIL MAKING MACHINE

Filed Jan. 4, 1924

Inventor:
Edward Craig
by Arthur F. Durand
Atty.

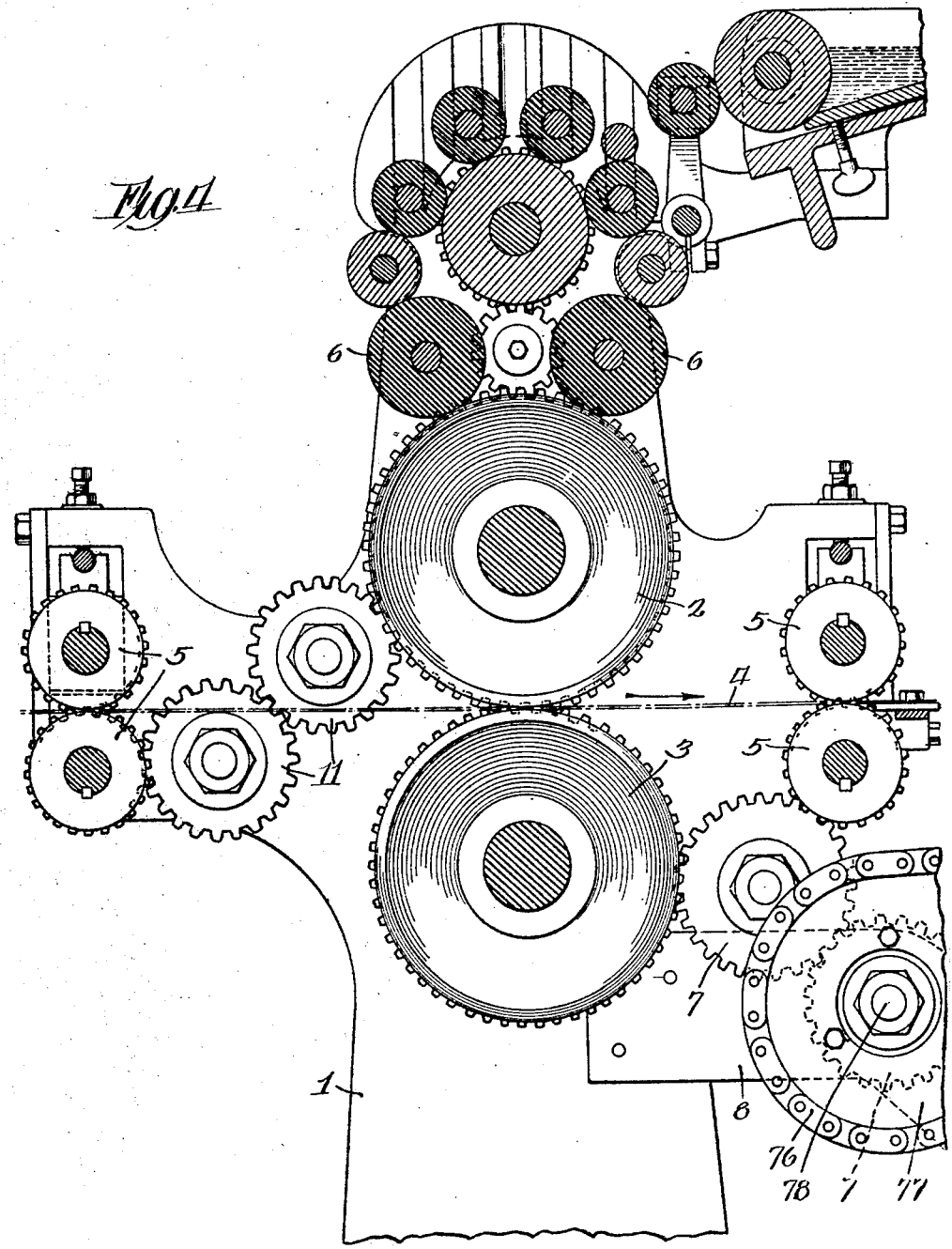

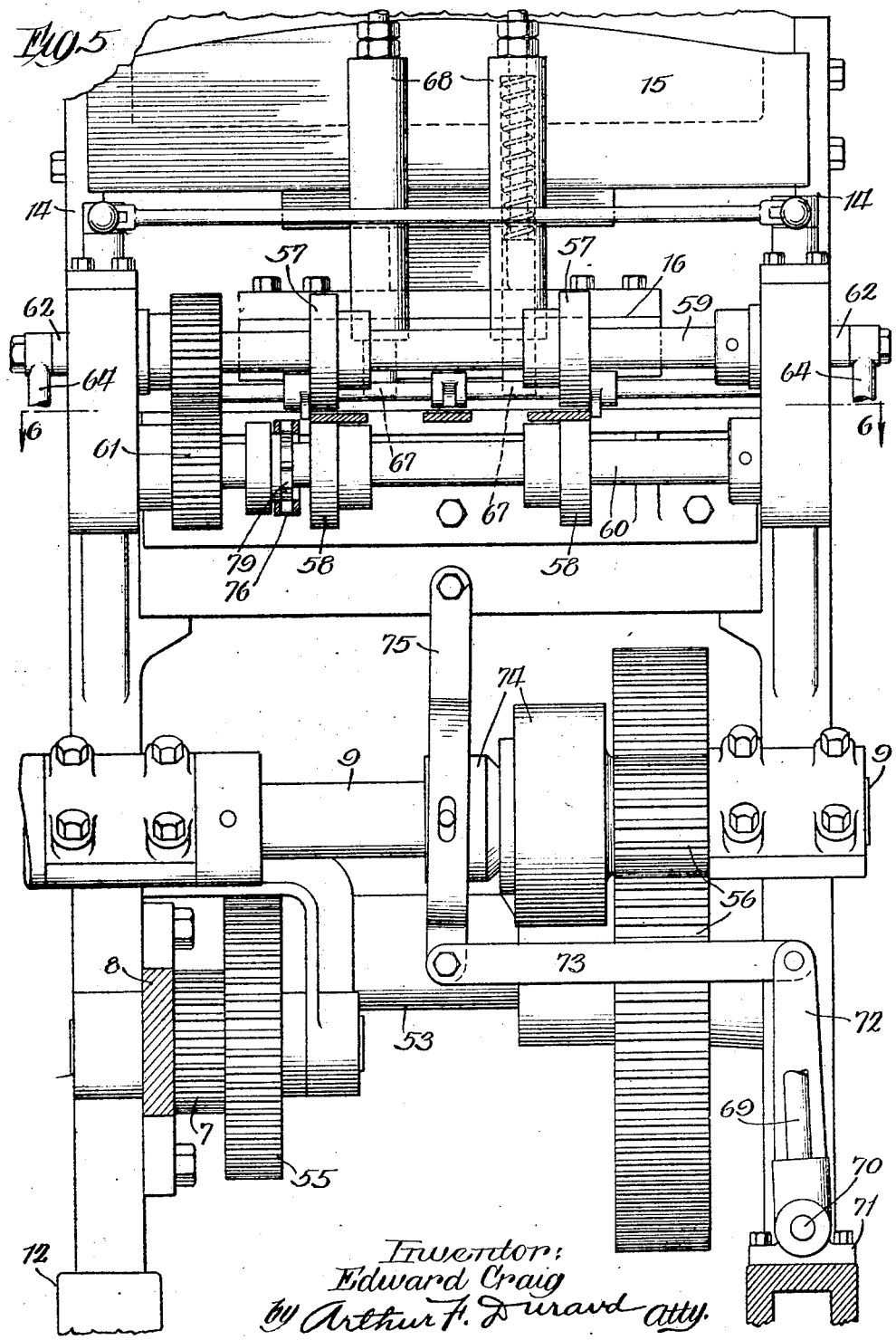

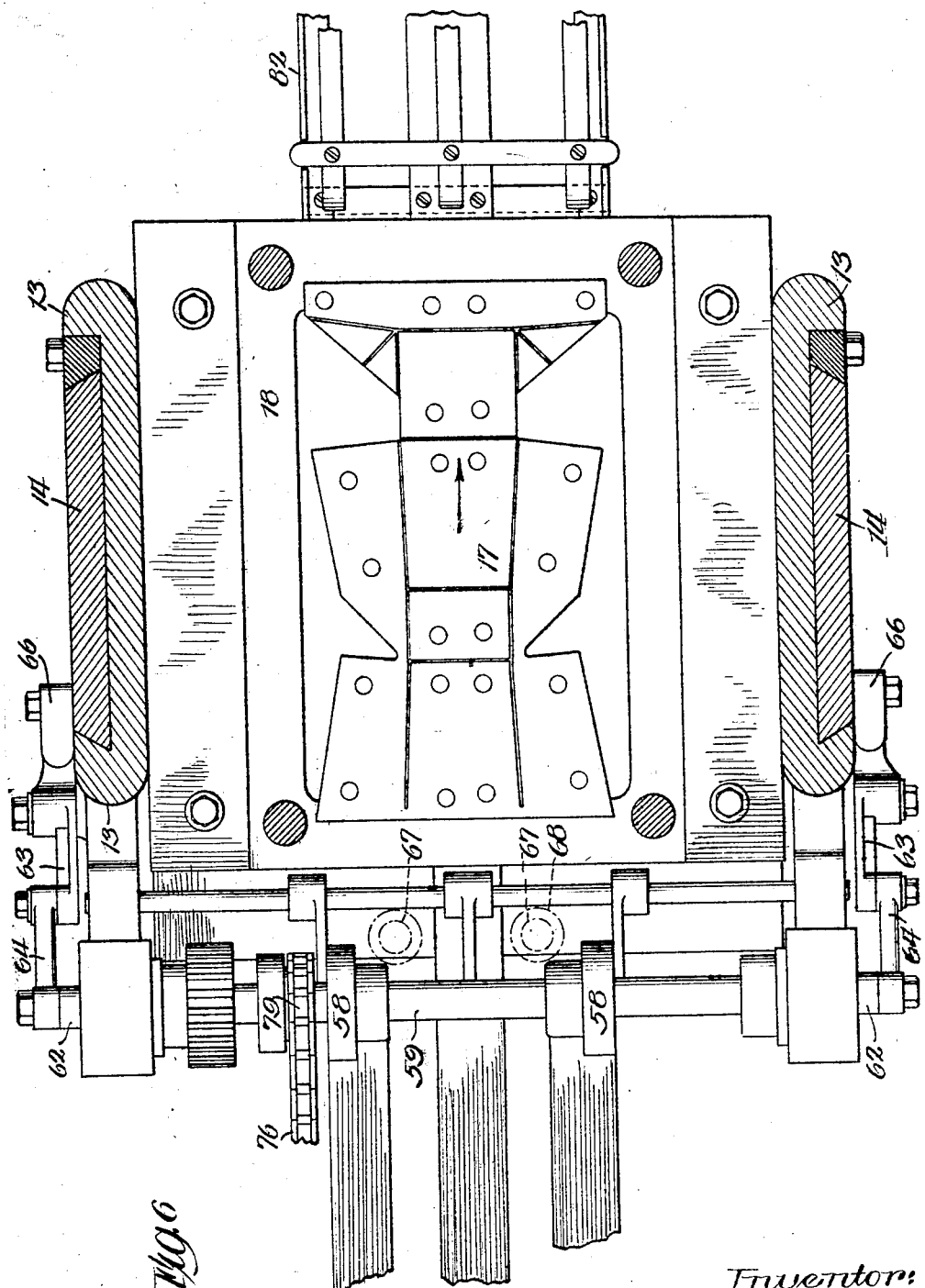

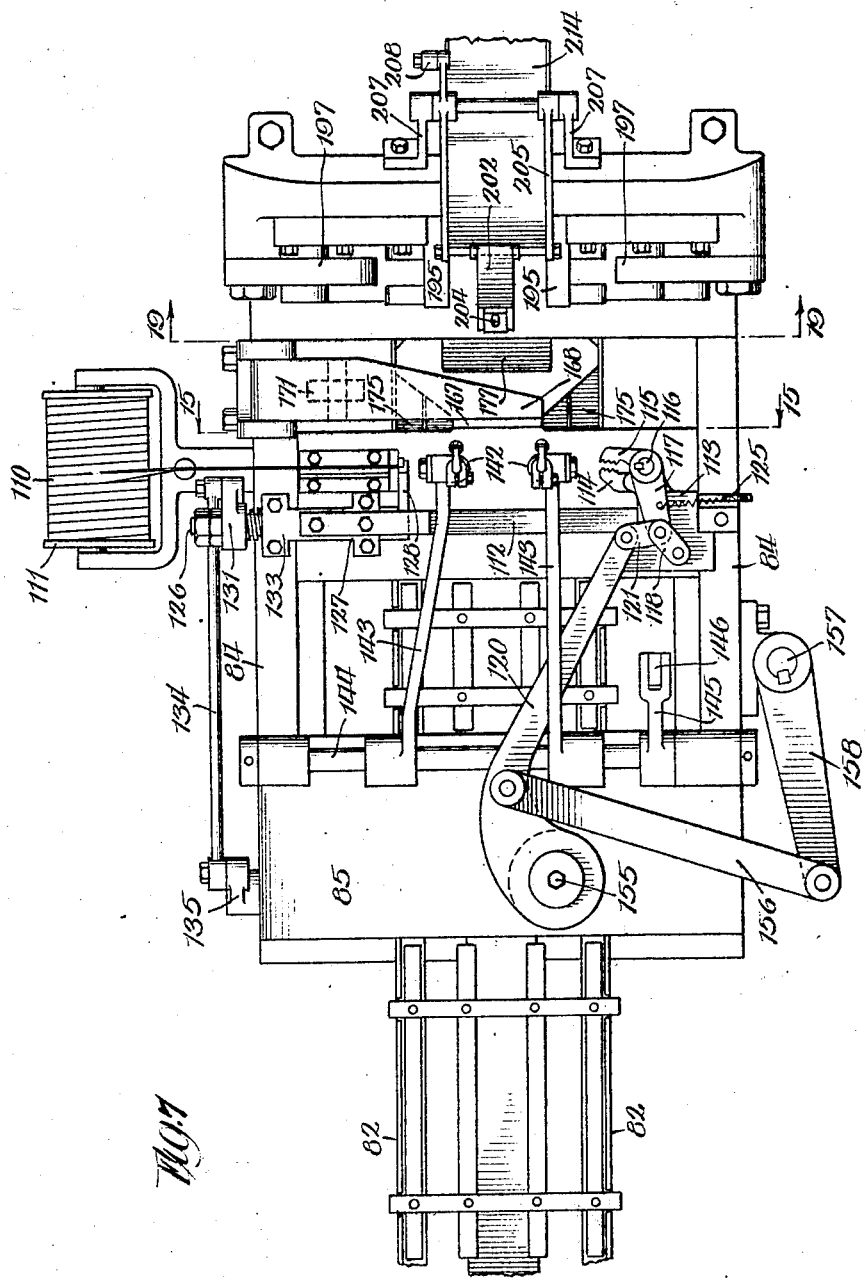

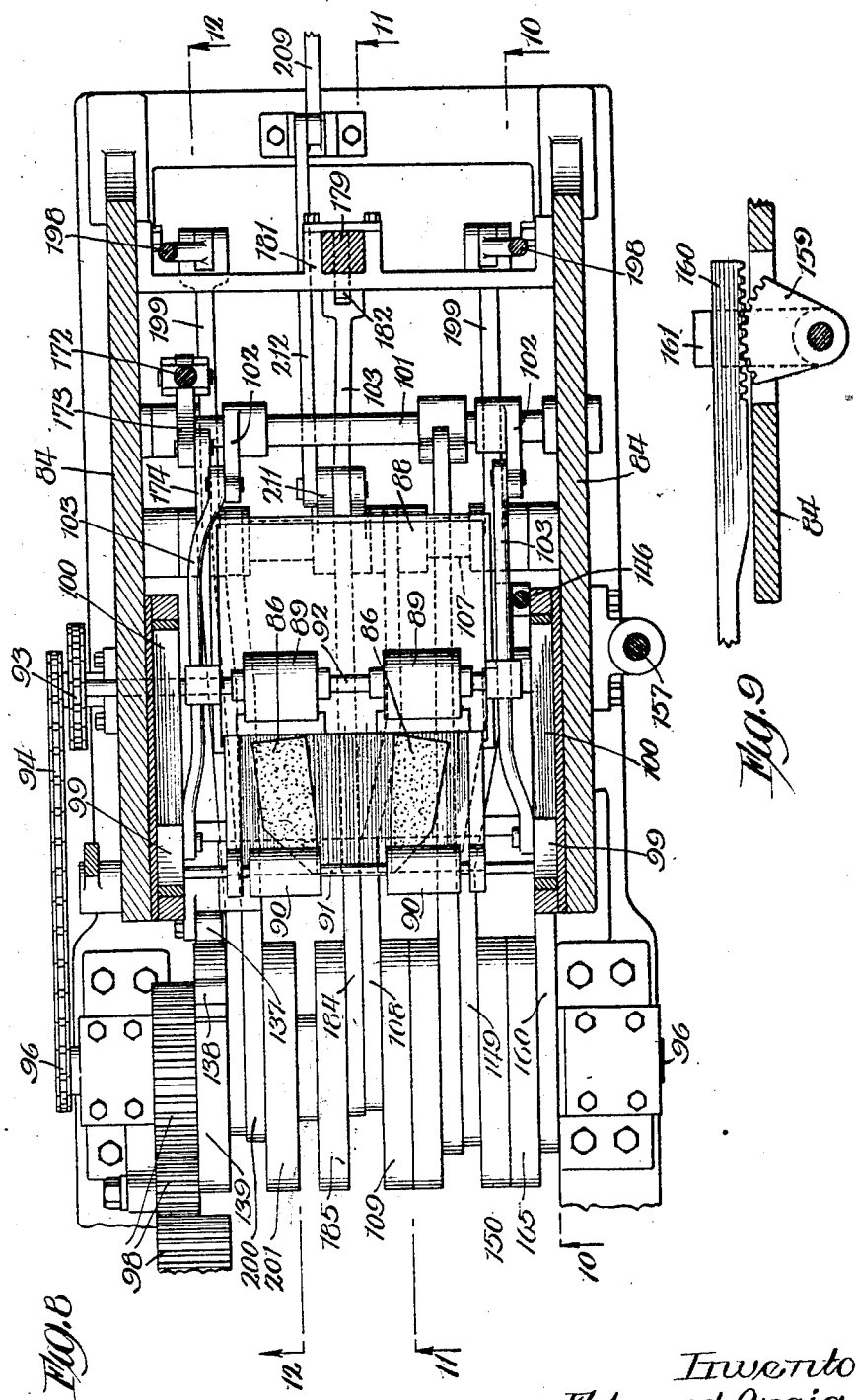

Dec. 29, 1925.
E. CRAIG
1,567,425
PAIL MAKING MACHINE
Filed Jan. 4, 1924     15 Sheets-Sheet 9
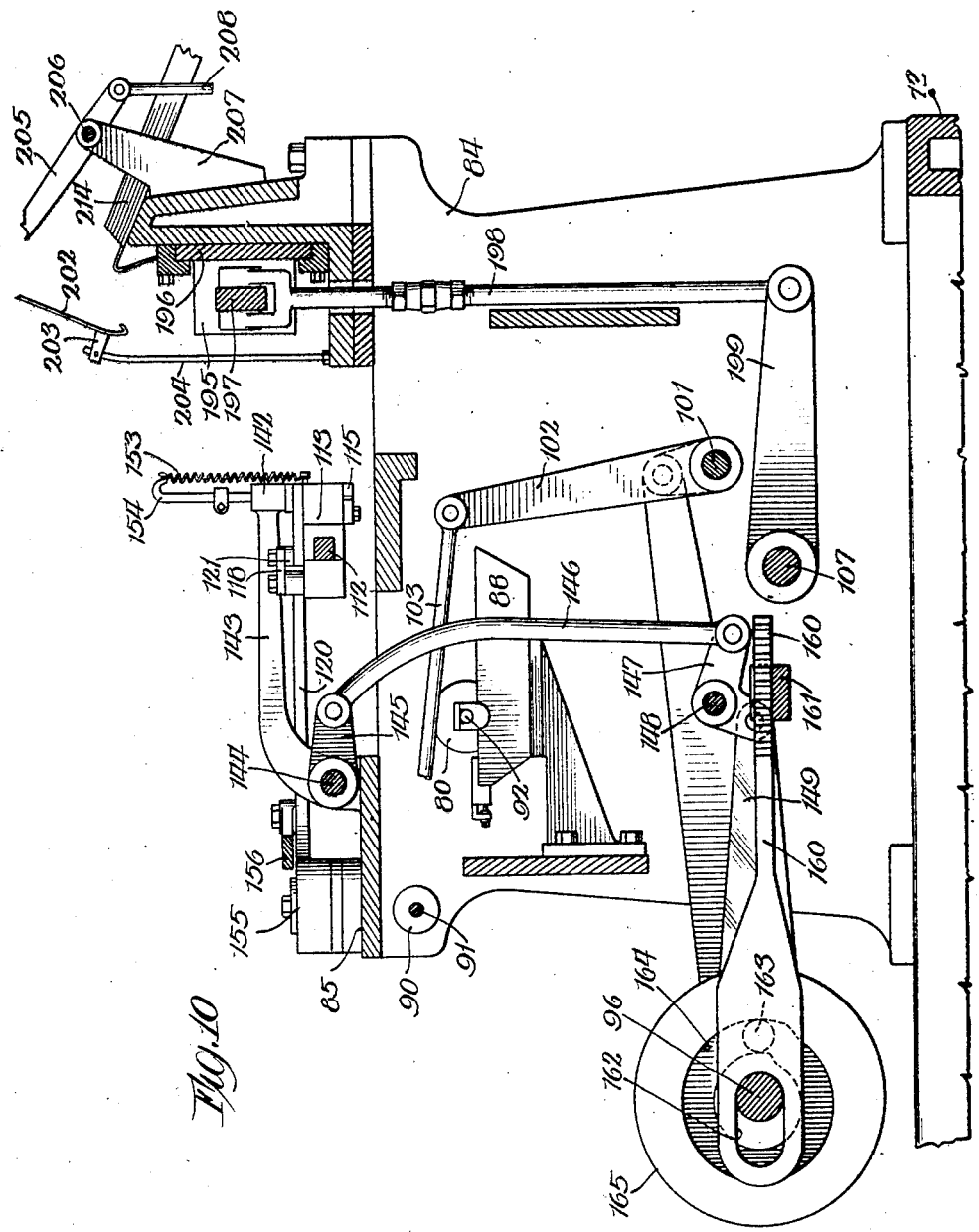
Inventor:
Edward Craig
by Arthur F. Durand
Atty.

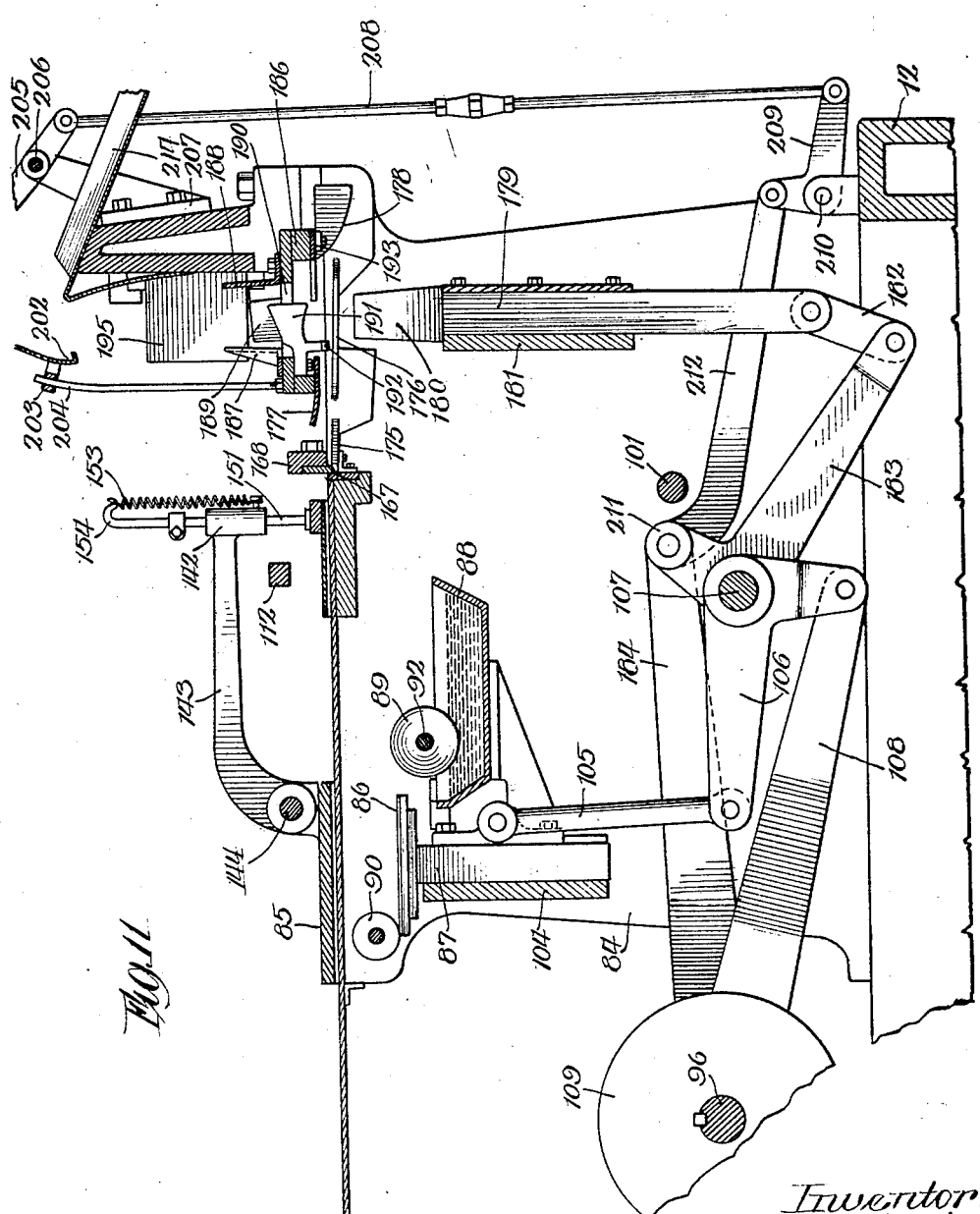

Dec. 29, 1925. 1,567,425
E. CRAIG
PAIL MAKING MACHINE
Filed Jan. 4, 1924   15 Sheets-Sheet 11
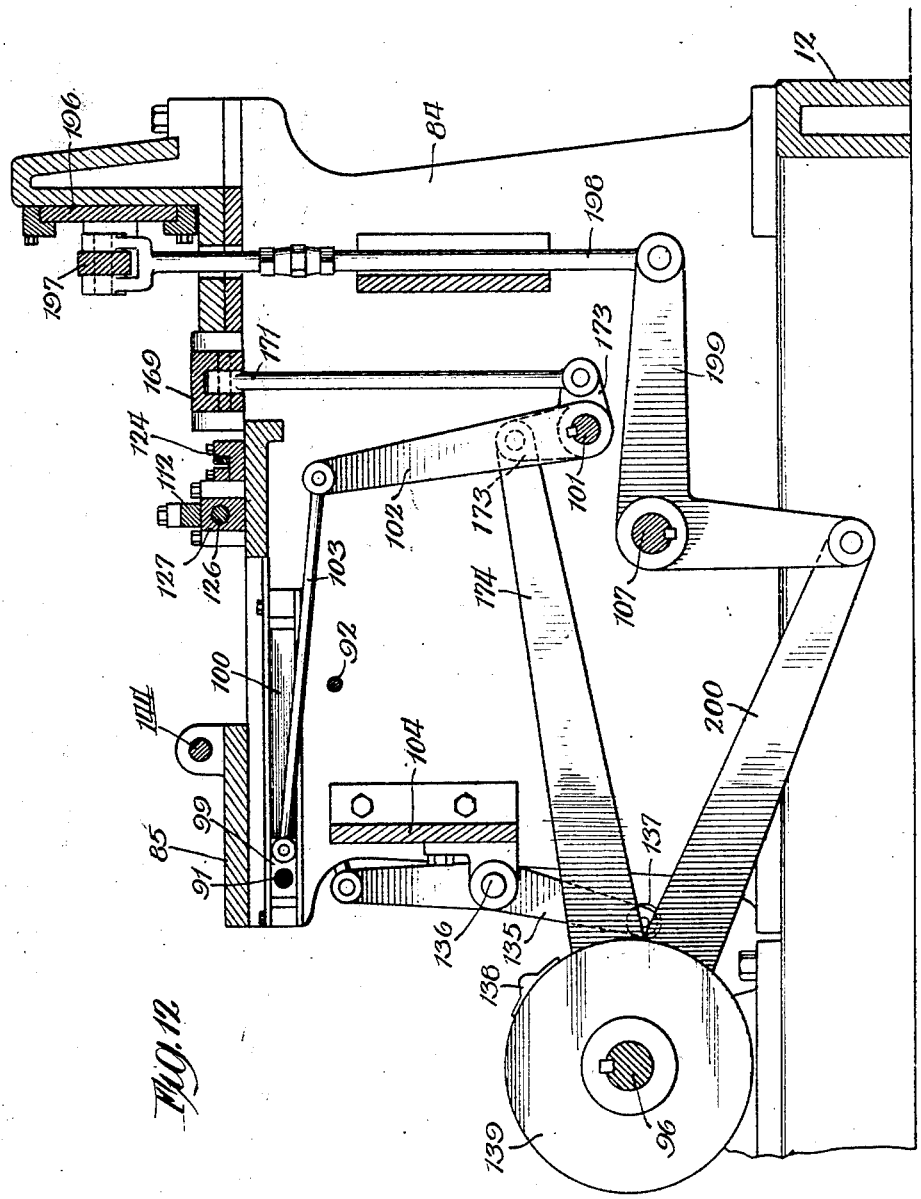
Inventor
Edward Craig
By Arthur F. Durand
Atty.

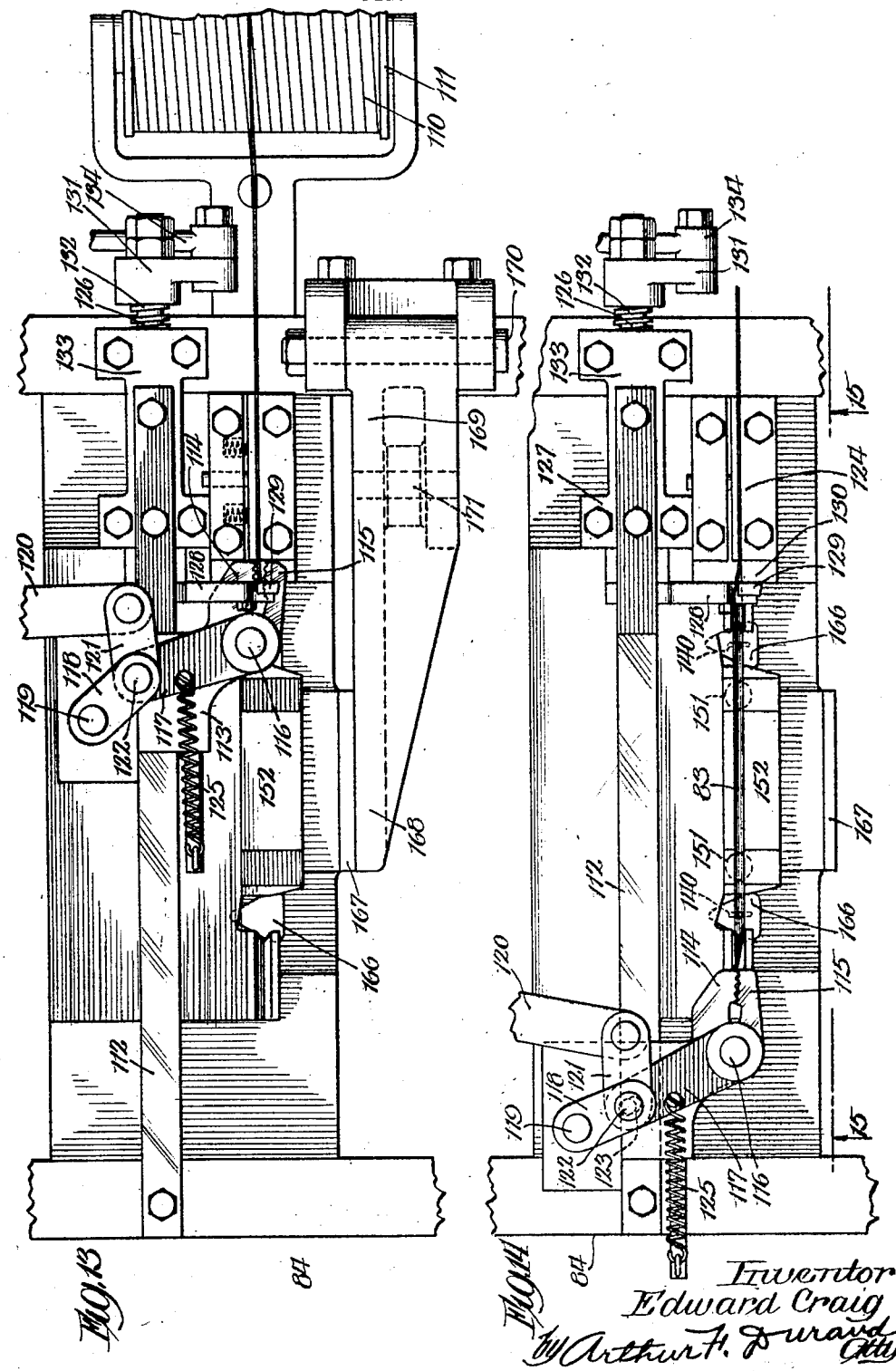

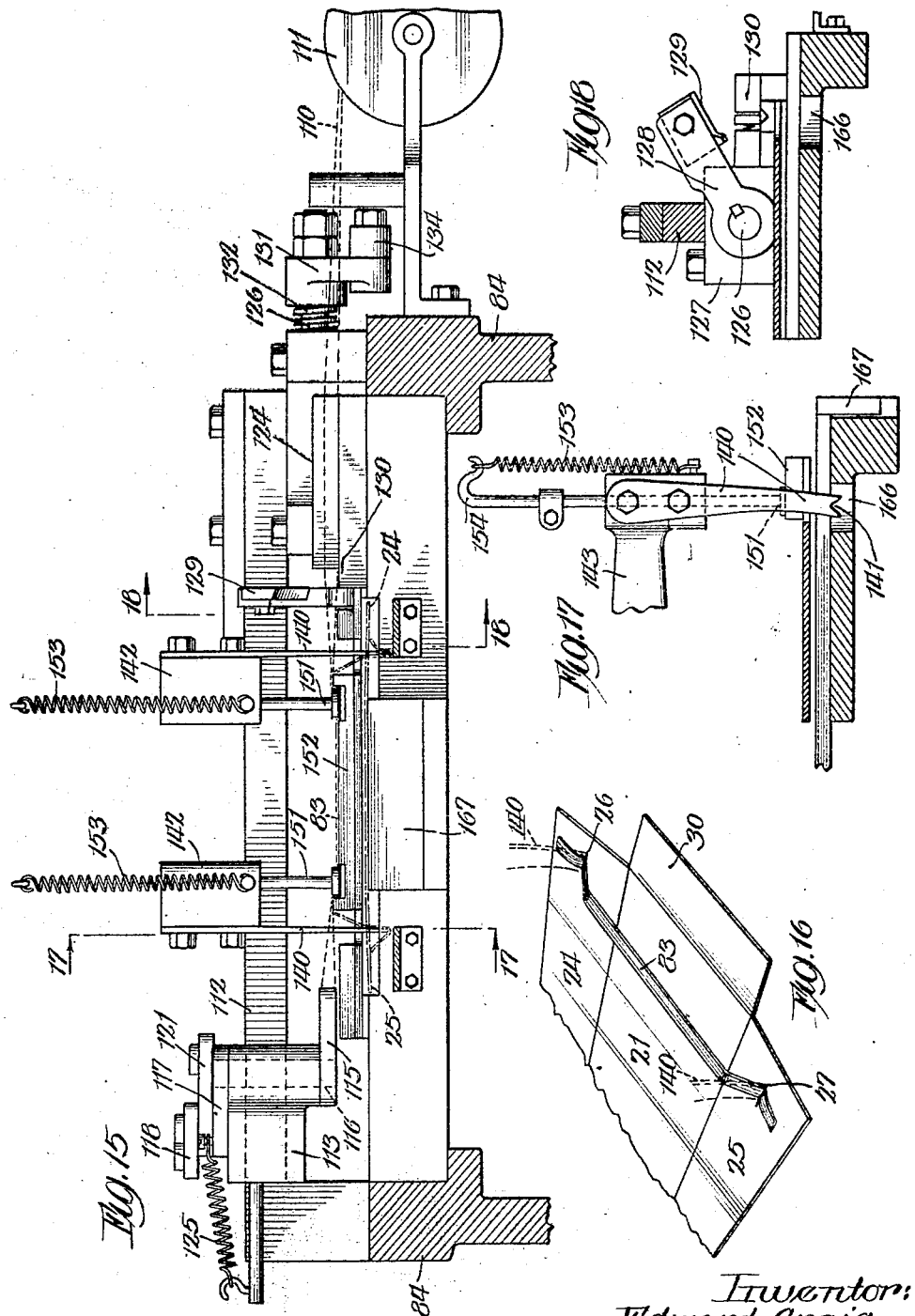

Dec. 29, 1925.  1,567,425
E. CRAIG
PAIL MAKING MACHINE
Filed Jan. 4, 1924.  15 Sheets-Sheet 14
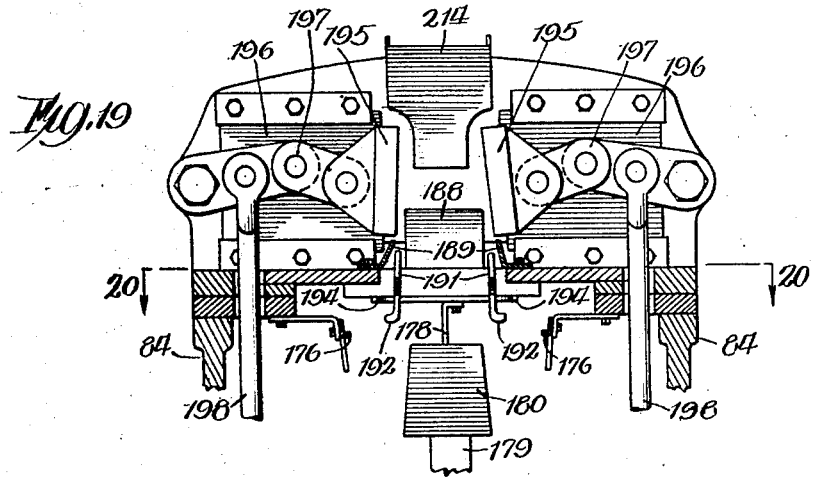
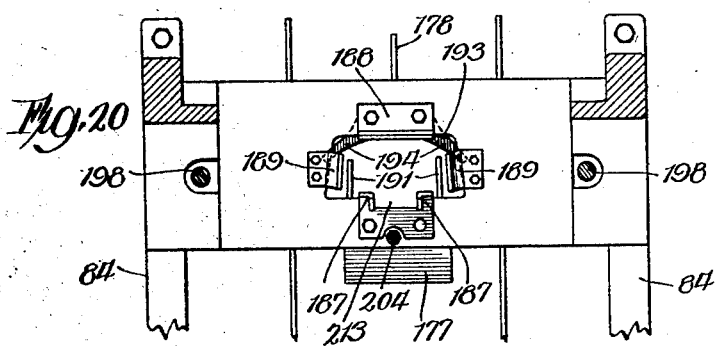
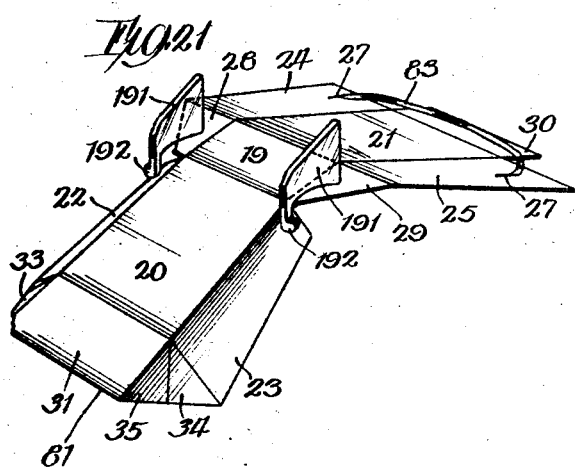
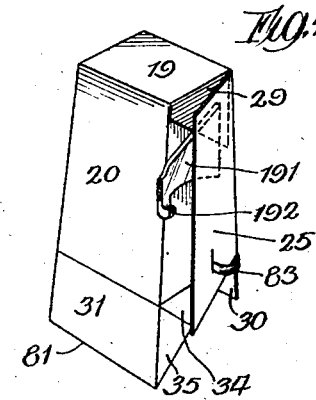
Inventor:
Edward Craig
by Arthur H. Durand
Atty.

Dec. 29, 1925.  
E. CRAIG  
1,567,425  
PAIL MAKING MACHINE  
Filed Jan. 4, 1924  
15 Sheets-Sheet 15

Inventor:  
Edward Craig  
by Arthur F. Durand  
Atty.

Patented Dec. 29, 1925.

1,567,425

UNITED STATES PATENT OFFICE.

EDWARD CRAIG, OF ST. JOSEPH, MICHIGAN, ASSIGNOR TO SARANAC AUTOMATIC MACHINE CORPORATION, OF BENTON HARBOR, MICHIGAN, A CORPORATION OF DELAWARE.

PAIL-MAKING MACHINE.

Application filed January 4, 1924. Serial No. 684,280.

*To all whom it may concern:*

Be it known that I, EDWARD CRAIG, a citizen of the United States, and resident of St. Joseph, Berrien County, Michigan, have invented a certain new and useful Improvement in Pail-Making Machines, of which the following is a specification.

This invention relates to machinery for making paper receptacles, or receptacles made of other sheet material, and more particularly to machinery for making receptacles having handles formed of tape or other flexible material requiring gluing or attaching apparatus to fasten the handles in place.

Generally stated, the object of the invention is to provide a novel and improved construction whereby the paper or other sheet material is fed forward in a satisfactory manner, and is finally folded into the desired shape, thereby to produce receptacles such, for example, as ice cream or oyster pails, in an inexpensive and satisfactory manner.

Another object is to provide a novel and improved construction whereby the paper for the manufacture of the receptacles is fed from a roll and taken through a printing press, then through a blanking press by which the blanks are made from which the ultimate product is formed, and whereby the blanks are cut off or separated, subsequent to the automatic feeding of the blanks, successively, to the mechanism for attaching the handles, and preliminary to the forming operation by which the blanks are folded to produce the pails or other ultimate product.

It is also an object to provide certain details and features of construction and combinations tending to increase the general efficiency and the desirability of a receptacle making machine of this particular character.

To this and other useful ends, the invention consists in matters hereinafter set forth and claimed, and shown in the accompanying drawings, in which—

Figure 1 is a side elevation of a combined printing and blanking and handling and forming machine, embodying the principles of the invention.

Figure 2 is a similar view showing the other side of the machine.

Figure 4 is a vertical section on line 4—4 in Figure 3.

Figure 5 is a vertical section, on a larger scale, on line 5—5 in Figure 1.

Figure 6 is a horizontal section on line 6—6 in Figure 5.

Figure 7 is a plan, on a larger scale, of the combined handling and forming machine shown at the right in Figure 1.

Figure 8 is a horizontal section, on a larger scale, on line 8—8, Figure 1.

Figure 9 is a detail sectional view on line 9—9 in Figure 1.

Figure 10 is a longitudinal section on line 10—10 in Figure 8.

Figure 11 is a longitudinal section on line 11—11 in Figure 8.

Figure 12 is a longitudinal section on line 12—12 in Figure 8.

Figure 13 is an enlarged plan view of certain portions of the mechanism for feeding the tape from which the handles are made, showing the parts thereof in position to pull the tape across the machine.

Figure 14 is a similar view showing the parts in the position which they occupy after having pulled the tape across the machine in position to be cut off and applied to the blank from which the receptacle is to be made.

Figure 15 is a transverse section on line 15—15 in Figure 14

Figure 16 is a perspective view of a portion of the blank, showing the method of applying the tape handle thereto.

Figure 17 is a detail section on line 17—17 in Figure 15.

Figure 18 is a detail section on line 18—18 in Figure 15.

Figure 19 is a transverse section on the line 19—19 in Figure 7.

Figure 20 is a horizontal section on the line 20—20 in Figure 19.

Figure 21 is a perspective of the blank in partially folded position, showing two of the folders which constitute a part of the instrumentalities for folding the blank.

Figure 22 is a view showing the blank folded into position to more nearly approximate the finished product, and showing the position of one of said folders at such time.

Figure 3:
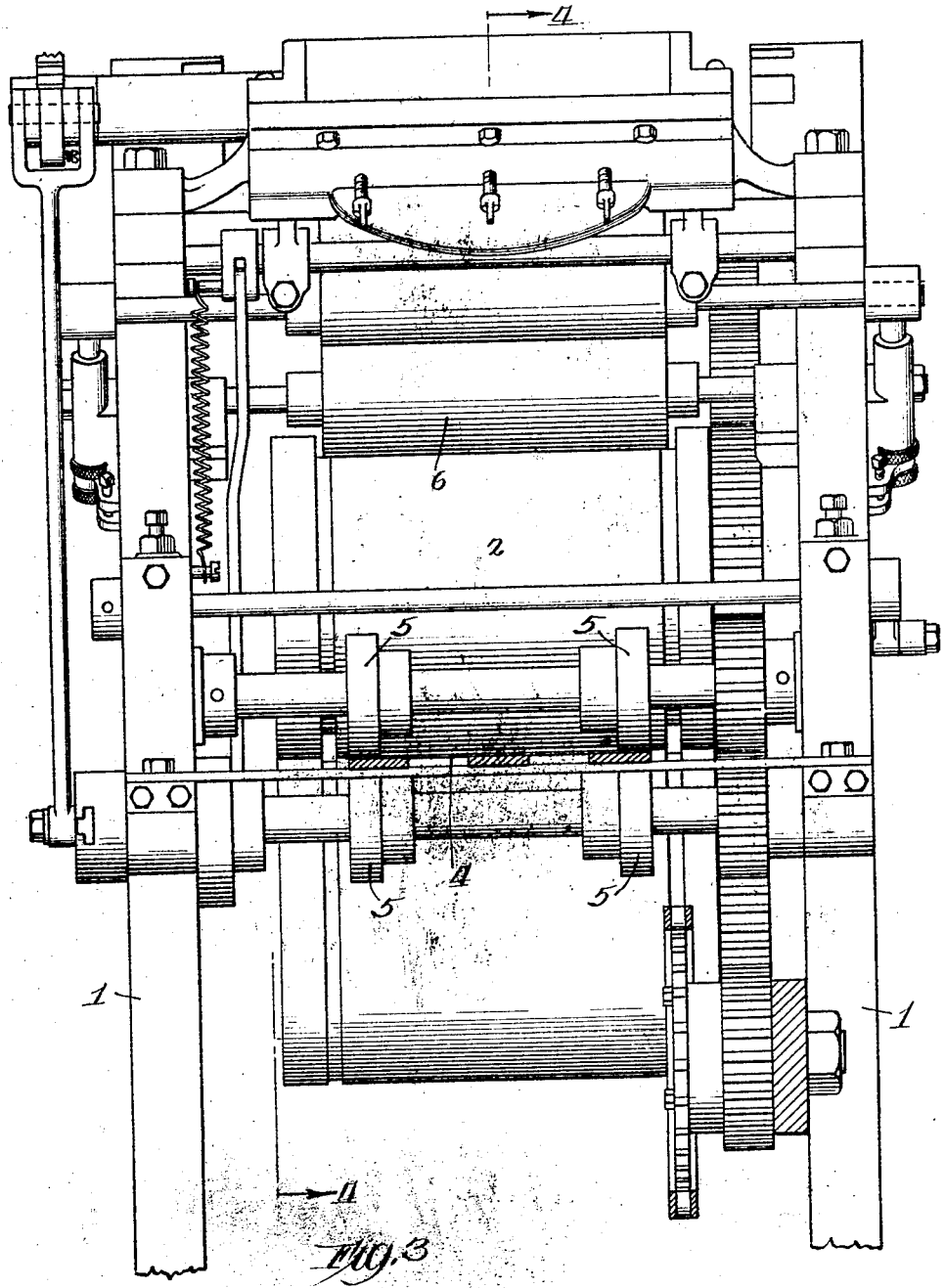
Figure 3 is a vertical section, on line 3—3, on a larger scale, in Figure 1.

As thus illustrated, the invention comprises a printing machine having a body frame 1, of any suitable character, and having rolls 2 and 3 between which the strip of paper 4 is fed forward in the direction indicated by the arrow in Figure 4, by the feed rolls 5, whereby the paper is printed in the desired manner, on the upper surface thereof. Various colors and various things can be printed on the paper, by means of the ink communicated to the roll 2 from the color or ink rolls 6, said printing press being of ordinary or any suitable form. The printing press is operated by gearing 7, consisting of a train of gears mounted on the support 8, the lower end of the support being adjacent the shaft 9 which has its outer end provided with a driving pulley wheel 10 by which the entire machine is operated, this shaft 9 being gear connected to the train of gears 7 in any suitable or desired manner. In this way the feed rolls 5, as well as the upper and lower printing rolls 2 and 3, are driven at the desired and necessary speed, the rolls 5 at the left in Figure 4 being driven by gears 11 which communicate the feeding motion from the upper roll 2, whereby the strip of paper is fed through the printing press in the desired manner.

Figure 23:
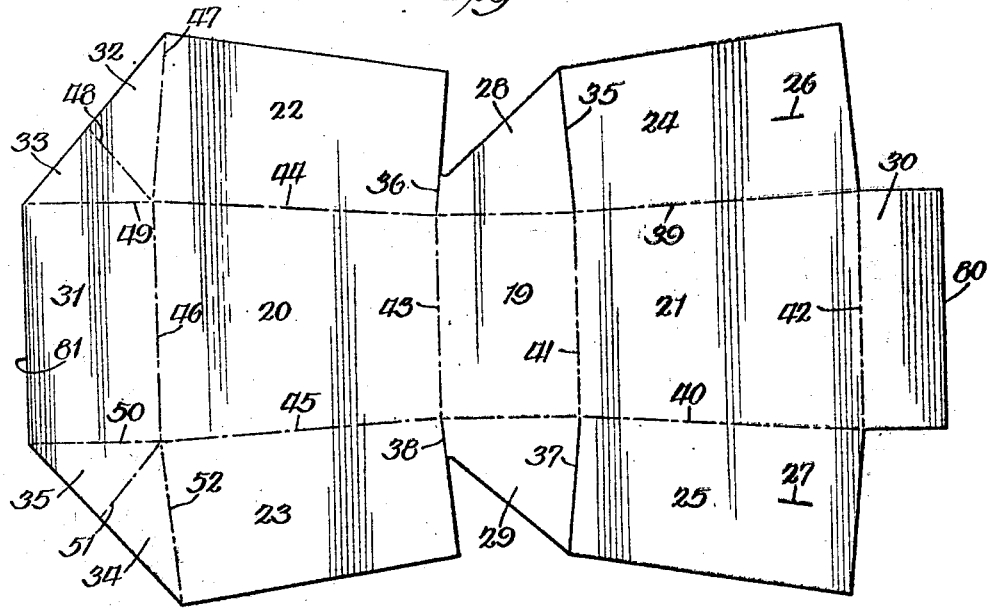
Figure 23 is a plan of one of the blanks from which the paper pails or receptacles are made.
Figure 24:
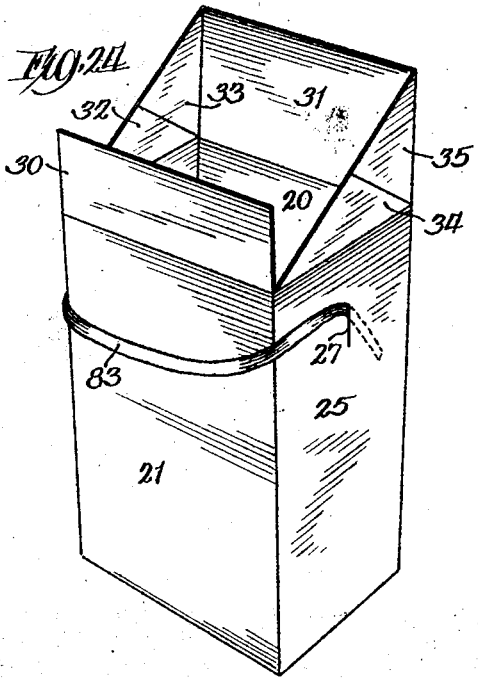
Figure 24 shows the finished product with its top left open for filling.
Figure 25:
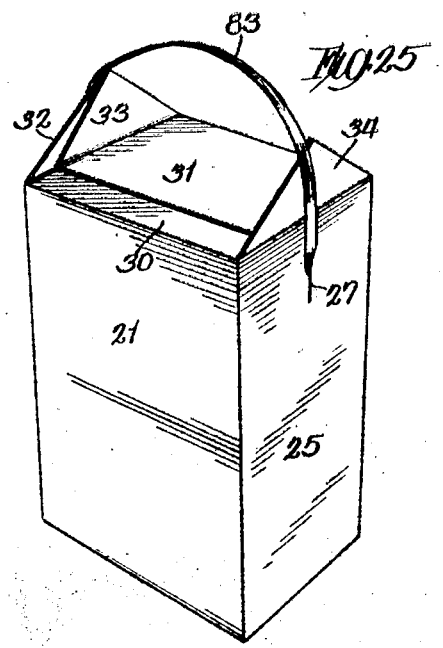
Figure 25 is a similar perspective view showing the pail with its top closed, or at least partially closed, by the flaps or closure portions provided for this purpose at the top of the pail.

It will be seen that the printing press body 1 is mounted upon the long base 12, which latter also supports the body frame 13 of the blanking press by which the strip of paper is converted into blanks, preliminary to the conversion of each blank into the ultimate paper or other receptacle. Said blanking press is provided at each side with vertically reciprocating members 14 and these members are, at the top of the machine, provided with a crosshead 15 upon the lower side of which is provided a die 16 adapted to cooperate with the lower stationary die 17 shown in Figure 6, this stationary die being mounted upon the table 18 which is rigid with the body frame of the blanking press. These two dies, the upper one and the lower one, are adapted to cooperate in forming the blanks, each blank, for the particular receptacle shown and described, being of the character shown in Figure 23, this blank having different portions as follows: first, the blank is formed with a rectangular bottom section 19, and with slightly tapered side sections, 20 and 21, and with flaps 22, 23, 24 and 25, which flaps overlap as shown in Figures 24 and 25, and Figure 22, when the blank is folded, whereby the pail will have two single thickness walls provided by the sections 20 and 21, and will have two double thickness walls formed by the flaps 22, 23, 24 and 25, the flaps 24 and 25 being formed with slots or incisions 26 and 27 for the attachment of the tape handle, as will hereinafter more fully appear. It will also be seen that substantially triangular flaps 28 and 29 are formed adjacent the bottom section 19, and that the section 21 has its upper edge provided with a rectangular flap 30, which remains upstanding while the receptacle is still open, as shown in Figure 24, but which is folded over when the top of the pail is closed. At the other end of the blank, the section 20 has a rectangular section 31 connected thereto and also triangular sections 32, 33, 34 and 35 whereby the top portion of the receptacle can be folded into closed position as shown in Figure 25 after the pail is finished. It will be understood that the lines 35 and 36 are cuts made entirely through the paper, and that the lines 37 and 38 represent similar cuts made entirely through the paper. On the other hand, the broken lines 39, 40, 41, 42, 43, 44, 45, 46, 47, 48, 49, 50, 51 and 52 are crease lines, or score lines, made in the paper by the cooperation of the upper and lower dies of the blanking press, whereby the blank may be folded in the desired manner, as will hereinafter more fully appear. The members 14 are reciprocated up and down by the shaft eccentric devices 53 operated by the gear 54 which meshes with the gear 55, the latter being driven by gearing 56 on the two shafts, or in any suitable or desired manner. The blanking press is provided with upper feeding rolls 57, and with lower feeding rolls 58, mounted on the upper and lower transverse shafts 59 and 60, connected by gearing 61, and shaft 59 being mounted in blocks or bearings 62 that are movable up and down, so that at times the upper feed roll 57 will move upward a slight distance, thereby to release the grip of the rolls on the paper. For the lifting of the upper rolls 57, at the proper time, any suitable or desired means can be employed, but in the construction shown this is done by means of a lever 63 having a link 64 that engages the outer end of the shaft 59, at each end of the machine, it being understood that this lever and link arrangement is duplicated at opposite sides of the machine, as indicated in Figures 1 and 2 of the drawings. Each lever 63 has its lower end provided with an adjustible set screw 65, and each member 14 has a lug 66 mounted thereon in position to engage the upper end of the set screw, at the proper time, thereby to tilt the lever 63 and thus slightly lift the shaft 59 and the feed roll 57 mounted thereon. Furthermore, the crosshead 15 is provided with springbacked hammers 67, mounted in the heads 68 which are rigid with said crosshead 15, in position to bear upon the paper when the crosshead moves downward, at the proper time, thereby to stop the feeding movement of the paper just before it is engaged by the upper die of the blanking press. The two hammers 67 will bear upon the paper at about the time the paper is released by the lifting of the upper rolls 57, whereby the feeding motion of the blanking press, or the machine for making the blanks, is intermittent in character. In other words, the feeding motion of the paper must stop, of course, during the operation of the blanking press, and during the action of the dies thereof on the paper, and this stopping of the feeding motion of the paper is accomplished in the manner stated. Of course, when the crosshead 15 moves upward, the paper is released by the hammers 67, and the feed rolls 57 move downward to engage and grip the paper, and in this way the paper is again fed forward. It will be seen, therefore, that while the feeding motion which the paper has through the printing press is continuous, the feeding motion of the paper through the blanking press is intermittent, and consequently some paper will accumulate between the printing press and the blanking press, in the form of a slack strip of paper, during the time that the dies of the blanking press are in action on the paper. However, and because of the higher speed of the rolls 57 and 58, as compared with the speed of the rolls of the printing press, this slack in the paper is quickly taken up, and by the time the blanking press is ready for the production of another blank the paper is stretched out flat and taut between the blanking press and the printing press.

For the control of the blanking press, and of the entire machine, as will hereinafter fully appear, a single hand lever 69 is provided, being mounted on a short rock shaft 70 mounted in a bearing 71 on the base of the machine. This rock shaft extends longitudinally of the base, and has its outer end provided with an upstanding arm 72, and to the upper end of this arm a link 73 is connected to extend horizontally therefrom. The shaft 9 is provided with an ordinary friction clutch 74, of any suitable character, operated by a lever 75 provided at its upper end on the stationary body frame of the blanking press, and connected at its lower end to the link 73 previously mentioned. Thus, when the hand lever 69 is pulled outward, by the attendant standing at the side of the machine, the clutch 74 will be closed, and power from the shaft 9 will be communicated to the pinion 56 and from the latter to the various power transmitting instrumentalities by which the blanking press and the printing press are driven, and by which the other portions of the machine are driven, as will hereinafter more fully appear. It will be seen that the lower feed rolls 58 are driven through the medium of the sprocket chain 76 which engages the sprocket wheel 77 on the shaft 78 upon which one of the gears 7 previously mentioned is mounted. Consequently, the rotation of the sprocket wheel 77 will operate the chain 76, and inasmuch as the sprocket chain is arranged over the similar sprocket 79 on the shaft 60, it follows that the lower feed rolls 58 will be driven at the requisite speed, and will be driven continuously during the operation of the machine.

The blanks formed by the blanking press remain connected at the edges 80 and 81, while leaving the blanking press, and travel over a sort of bridge or guideway 82 at the other or discharge side of the blanking press, and are finally delivered to the instrumentalities for applying an adhesive and a tape handle 83 to each blank, said instrumentalities being supported in the body frame 84 which is also supported on the long base 12 of the machine as a whole. The blanks move in under the plate 85, which is stationary on the top of the body frame 84, in position to have the under surfaces of the flaps 24, 25, 28 and 29 provided with glue or paste or some suitable adhesive, which is applied by the elements 86 shown in Figure 8, which are similar in shape to said flaps, and which are mounted on the vertically reciprocating plunger 87 shown in Figure 11, it being understood that this plunger moves upward at the proper time to apply the adhesive to the undersurface of the blank. A receptacle 88 is provided in position to contain the adhesive, and smearing rolls 89 are provided for applying the adhesive to the top surface of the elements 86, which latter may be of any suitable material which will hold the adhesive and suitably apply it to the undersurface of the blank. The adhesive is not communicated directly from the rolls 89 to the elements 86, but indirectly through the medium of the rolls 90 which are mounted on the shaft 91 extending transversely of the machine, while the rolls 89 are mounted on a transverse shaft 92 supported in any suitable manner and driven by the sprocket chains 93 and 94, these sprocket chains engaging the sprockets on the transverse shaft 95 supported by the body frame 84, and the chain 94 engaging a sprocket on the end of the shaft 96 supported in suitable bearings 97 mounted on the base of the machine. A train of gears 98 is provided between the shaft 96 and the gear 54 previously mentioned, so that the shaft 96 is rotated at the requisite or necessary speed, during the operation of the machine, thereby to rotate the roll 89 in the necessary manner. The shaft 91 has its ends supported in bearings 99 which are slidable back and forth in longitudinal guides 100 provided on the frame 84 of the machine. A transverse rock shaft 101 is mounted in suitable bearings on the frame 84 and is provided with arms 102, and links 103 connect the upper ends of these arms with the bearings 99, so that each time the plunger 87 moves downward the rolls 90 move over the upper surface of the elements 86 and make contact with the smearing rolls 89, and receive some adhesive therefrom, and then move backward across the surface of the elements 86 and apply the adhesive thereto. Of course, the plunger 87 moves upward when the rolls 90 are in engagement with the rolls 89, and in such position the rolls 90 will not interfere with the upward movement of the plunger to apply the adhesive to the undersurface of the blank, the pressure of the plunger being resisted by the flat undersurface of the plate 85 which at such time forms a backing for the blank. When the plunger 87 moves downward, the rolls 90 then leave the rolls 89 and traverse the surface of the elements 86, and then return to position in engagement with the rolls 89, so that the plunger 87 may again move upward, and this operation is repeated for each blank, as the blanks are successively fed from the blanking machine. Of course, at this point, it becomes apparent that the operation of the adhesive applying instrumentalities must be timed to take place at the same time that the blanking press is making another blank, for the paper must be stationary during the blanking operation, and again the paper must be stationary during the application of adhesive thereto. Consequently, when the blanking press is operating upon the sheet or long strip of paper to form another blank, a blank previously formed, but not as yet detached from the strip, is having its underside smeared with an adhesive, not entirely, but simply the undersurface of the flaps 24, 25, 28 and 29 as previously explained. The plunger 87 is mounted to slide up and down on the guide 104, supported on the body frame 84, and the plunger has the upper end of a link 105 connected thereto, to produce the up and down movement of the plunger. The lower end of this link is connected to an arm of a bell crank 106 mounted on the transverse axis member 107, which latter is supported at its ends by the body frame 84 of the machine. The other arm of the bell crank 106 is connected to a pitman 108 which is operated by any suitable means, to rock the bell crank 106, but which is preferably operated by an eccentric cam device 109, of any suitable or desired character, mounted on the shaft 96 previously mentioned.

Now the instrumentalities to which the blanks are fed from the blanking press, in order that they may be converted into pails or other receptacles, also comprise some devices for applying the tape handles 83 to the blanks, before they are folded, but after they are provided with the adhesive in the manner explained. For this purpose a roll of tape 110 is provided, on a reel 111 suitably supported at one side of the frame. A crossbar 112 is mounted on the body frame 84 and upon this crossbar is a sliding member 113 having a jaw 114 rigid therewith. The movable jaw 115 is pivoted at 116 on the slide 113, in position to cooperate with said stationary jaw 114, and this movable jaw has a rigid arm 117 which is pivotally connected to the link 118 and which latter is pivoted at 119 on the slide 113, in the manner shown. An operating arm 120 is provided and connected by a link 121 with the toggle joint 122 formed between the arm 117 and the link 118, there being a little lost motion in this toggle joint as indicated by the slot 123 shown in dotted lines in Figure 14 of the drawings. Consequently, when the slide 113 is at one side of the machine, as shown in Figure 13, it is in position to grasp the end portion of the tape, which latter slides in a guiding device 124 of any suitable character. When the arm 121 is actuated it forces the slide 113 toward the other side of the machine, and operates the toggle joint mentioned, causing the movable jaw 115 to cooperate with the stationary jaw 114 to grip the end portion of the tape, thus pulling the tape across the machine, above the blank to which it is to be attached, in the manner shown in Figure 14 of the drawings. A spring 125 is provided, preferably, and connected to the arm 117 in such a manner as to tend constantly to straighten out the toggle joint, so that the jaws will close upon the end portion of the tape just as soon as the actuating arm 120 starts to move into the position in which it is shown in Figure 14 of the drawings, thus instantly gripping the tape and pulling it across the machine. Now the length of tape thus pulled across the machine must be cut off, and for this purpose a rock shaft 126 is provided, suitably mounted in a bearing 127 on the machine frame, and this rock shaft is provided with an arm 128 to which a knife 129 is secured. This knife forms a shearing knife and cooperates with the end portion 130 of the guiding device 124, so that the end 130 forms the ledger blade of the complete cutting device thus formed. At the proper time, therefore, the knife 129 swings downward to cut off the tape, so that the severed section of tape may be applied as a handle to the blank. This rock shaft 126 has an arm 131 mounted thereon, and a coil spring 132 is preferably interposed between this arm 131 and the bearing 133 for said shaft, so that the shearing knife 129 will always make pressure contact with the ledger blade 130, thereby to insure cutting of the tape. It will also be seen that a long link 134 is connected to the end of the arm 131, and that the end of this long link is connected to the upper end of a lever 135, which latter is pivoted on the machine frame at 136, in the manner shown in Figure 2 of the drawings. For the actuation of this lever 135, thereby to actuate the cutting device in the desired manner, the lower end of this lever 135 is provided with a roller 137 which is disposed in position to engage the cam projection 138 on the eccentric device 139 as shown in Figures 2 and 8 of the drawings, which eccentric device 139 is mounted on the shaft 96 previously mentioned.

Now for the threading of the end portions of the tape through the slots 27 previously mentioned, as shown in Figure 16, two fingers 140 are employed, each finger having a notch 141 at its lower end to engage the tape, thereby to push the tape through the slots 27 as shown in Figures 15 and 16 of the drawings. These fingers for threading the tape through the slots of the blank are mounted on heads 142 carried on arms 143, which arms are in turn mounted on the rock shaft 144, suitably mounted in bearings on the body frame of the machine. This rock shaft is provided with an arm 145 to which the upper end of a long link 146 is connected, and the lower end of this link is connected to one arm of a bell crank 147 mounted on the transverse axis member 148, while said bell crank has its other arm connected by a pitman 149 with the eccentric cam device 150, which latter is also mounted on the transverse shaft 96 previously mentioned. The heads 140 are also provided with spring backed foot-like devices 151 which bear upon the severed section of tape, against the plate 152, as shown in Figure 15, thereby to clamp the tape firmly in position while its two end portions are being threaded through the slots in the manner described. The springs 153 furnish the yielding backing for these foot-like devices 151, so that they have a yielding pressure on the tape, each spring having its upper end connected to the upper end portion 154 of the rod, forming the shank of one of said foot-like devices.

Now the arm 120, as shown in Figure 7, is pivoted on the plate 85 at 155, and has a link 156 connected thereto. A vertically disposed rock shaft 157 is mounted in suitable bearings at one side of the machine, and is provided with an arm 158 having its end pivoted on the other end of the link 156 by which the arm 120 is actuated. Said vertically disposed rock shaft 157 is provided with a curved rack or segment 159 which engages the straight and endwise reciprocating rack 160 held in position by the guide 161 just inside of the side wall of the machine frame. This rack 160 has its other end provided with a slot 162 for the shaft 96, so that the rack may reciprocate endwise on said shaft. Also, as shown in Figure 10, the rack 160 has a projection 163 which engages the cam groove 164 of the eccentric device 165 mounted on the shaft 96, to rotate therewith, whereby the arm 120 is vibrated in the desired manner, in suitably timed relation to the other elements of the machine, thereby to cause the transverse feeding of the tape in the manner previously explained. It will be seen that the frame of the machine has openings 166 for the lower ends of the fingers 140, when the latter are moved downward to press the end portions of the tape through the slots 27 of the blank. In this way, the end portions of the tape are brought below the blank, and in position to be thereafter folded back against the gummed surfaces on the under side of the blank.

Now from these instrumentalities for gumming and applying the tape handle, the blank thus gummed and supplied with a handle passes onward to a position where it is folded. The feeding movement of the sheet, caused by the blanking press and the printing press, is sufficient to carry the blank with the handle thereon into the desired position for folding, and then the blank must be cut off, so that the severed blank can be folded to produce the desired receptacle. This severing of the blank from the strip or sheet is accomplished by means of the stationary knife 167 mounted on the frame, and the movable knife 168 carried on the arm 169 which is pivoted on the bolt 170 at one side of the machine, so that this movable knife swings up and down in a transverse plane, on an axis extending longitudinally of the machine. The arm 169 is provided with a pivot 171 for the upper end of the rod 172 which latter has its lower end connected to one arm of the bell crank 173 which bell crank is on the axis member 101 previously mentioned. The other arm of this bell crank is connected by a pitman 174 with the eccentric device 139, whereby this pitman is reciprocated in the desired manner to move the arm 169 up and down, thus causing the knife 167 to descend at the proper time and cut off the blank, on the line 80 and 81, so that the gummed blank with the handle attached thereto is then free to be folded in the desired manner. While the blank is thus being cut off, it will be seen that it rests upon the ledges 175 and 176 properly supported on the frame of the machine and below the guard plate 177, the said ledges being slightly inclined to give the blank a slight downward tilt at its forward end, and at its forward end the blank will strike the deflector 178, so that the end portion 30 of the blank will be deflected downward a distance.

The mechanism for folding the blank comprises a vertically disposed plunger 179 having the inverted form 180 on the upper end thereof, said plunger sliding up and down on the guide 181, and having its lower end connected by a link 182 with one arm of the bell crank 183 which latter is mounted on the axis member 107 previously mentioned. The other or shorter arm of this bell crank 183 is connected by a pitman 184 with the eccentric device 185, whereby this pitman is reciprocated to move the form 180 up and down, in properly timed relation to the other operative parts of the machine. Above the form 180 there is a stationary structure 186 provided with upstanding front and rear guards 187 and 188, and with side guards 189, and in the well or opening 190 formed in this structure 186, there are two deflectors 191 having depending engaging portions 192, as shown in Figures 11, 19, 20, 21 and 22, and at a point a little below, there is a curved member 193 having fingers 194 as shown.

When the plunger and its form 180 move upward, against the bottom section 19 of the blank, the folding action is as shown in Figures 21 and 22, which involves engagement of the portions 192 with the sections 22 and 23 of the blank, and the engagement of the deflectors or folders 191 with the sections 28 and 29 of the blank, so that the sections 28 and 29 are folded on the outer surfaces of the sections 22 and 23, and thereafter the fingers 194 engage the sections 24 and 25 to fold these flatwise against the sides of the receptacle thus formed, as shown in Figure 22, so that the blank is folded around the form in the manner shown. The continued upward movement of the plunger causes the receptacle thus partially formed to rise between the guards 187, 188 and 189, and to disengage the deflectors 191, and thus the receptacle is brought into position to be clamped tightly upon the form by the jaws 195, which latter are mounted on the slides 196 that slide laterally in a vertical transverse plane. For the operation of these jaws 195, toggles 197 are provided, and rods 198 have their upper ends connected to these toggles, so that a downward pull on these rods will force the jaws 195 forward against the folded sides of the receptacle, causing the sections that are gummed or provided with an adhesive to firmly engage the outer surfaces 22 and 23, in a manner that will be readily understood. Thus the end portions of the handle 83 are squeezed in tightly between the two thicknesses of each side of the pail or receptacle, and are held in place by the adhesive, in a very effective manner. The rods 198 have their lower ends connected to arms 199 fixed on the rock shaft 107 and the latter is rocked by the pitman 200 which engages the eccentric cam device 201, this pitman being attached at its outer end to an arm rigid with the shaft 107, whereby reciprocation of this pitman will rock this shaft and thereby move the arms 199 up and down in unison, in properly timed relation to the other parts of the machine, thereby to actuate the jaws 195 at the proper time to clamp the receptacle to the form.

Means are provided for discharging the finished pail or ultimate product from the machine, comprising a hook 202 having a portion 203 which slides up and down on the guide member 204, suitably mounted on a stationary portion of the machine. This hook is carried on the upper end of the lever 205 which is pivoted at 206 on a bracket 207 mounted on a stationary portion of the machine. A rod 208 has its upper end pivoted on the outer end of the lever 205, and has its lower end pivoted on one end of the bell crank 209, which latter is pivoted at 210 on a stationary portion of the machine. An arm 211 is loose on the rock shaft 107, and is connected by a link 212 with the other end of the bell crank 209, as shown. It will be seen that the arm 211 is a part of the bell crank 183, previously mentioned, and hence the link 212 is actuated by the pitman 184 and the eccentric cam device 185 previously mentioned, whereby the plunger 179 and the hook 202 are operated in properly timed relation to each other, so that when the form 180 moves downward, the hook 202 will move upward. It will be seen that the hook 202 is adapted to engage the edge 81 of the receptacle, the guard 187 having a clear space 213 into which the hook 202 may enter to engage the said edge 81 of the receptacle, whereby the hook 202 will then pull the receptacle upward. This movement will tip the receptacle over onto the chute or trough 214, so that the finished pail or ultimate product may be discharged from the machine.

From the foregoing, it will be seen that the machine as a whole constitutes means for automatically feeding a strip of paper or other sheet material to the instrumentalities for applying gum or adhesive, and also a handle, and that the means for producing the feeding motion of the sheet comprise, in the embodiment of the invention shown and described, a blanking press for forming the blanks, and to which blanking press the sheet or strip of paper is fed by a printing press. From the instrumentalities for applying the adhesive and the tape handle the blank, still attached to the long sheet or strip of paper, is then fed into position to be folded, and before being folded is cut off from the end of the sheet or strip. Thus the operation is continuous, starting with the printing of the sheet, and following with the blanking and gumming and handling steps, preliminary to the cutting off of the paper blank, and thus similar operations are performed each time the sheet or strip of paper is stationary. While the sheet is stationary, the blanking press is forming a blank, the gumming devices are gumming a previously formed blank, the tape handling instrumentalities are applying a handle to still another blank, all three blanks being still connected together in the long strip, and at the same time, a severed blank is being folded by the forming mechanism at the discharge end of the machine. Each feeding motion of the strip or sheet serves not only to feed the material through the printing press, but serves also to feed a completed blank from the blanking press, to feed a gummed blank from the gumming instrumentalities, and to feed a gummed and handled blank to the forming mechanism. The entire machine is driven by the pulley 10, previously mentioned, under the control of the single hand lever 69, and in this way a strip of paper or sheet material, fed from a roll, can be operated upon successively by the printing press, blanking press, gumming, handling and forming devices to convert the sheet or strip into pails or other receptacles, or any desired ultimate product.

It will be understood that the long strip of paper from which the blanks are made can be fed from a roll, to the printing press, the paper being drawn from the roll (not shown) by the feed rolls of the press. As stated, the power for the operation of the entire machine, including the feeding of the strip of paper, the printing and blanking and gumming and handling, and folding thereof, being supplied from a centrally located driving mechanism operated by the pulley wheel 10 in the manner explained. This pulley wheel drives the shaft 9; the latter is gear connected to the shaft having the eccentric devices 53 at the ends thereof, and this eccentric shaft then drives the gearing 54 and 55 and the train of gears 7 to operate the printing press. Power is transmitted in the other direction from the gear 54 to the shaft 96, in the manner explained, to various instrumentalities, and it will be understood that the various gears and other power transmitting instrumentalities are all so proportioned that the different devices will be properly timed, relatively to each other, thereby to insure the desired results and the mode of operation described and shown. It will be seen that the mechanism for forming the pails from the blanks is so arranged that the exterior of each pail is formed by the printed surface of the blank, inasmuch as the upper surface of the long strip of paper is operated upon by the printing press, to provide this surface with any decoration or printed matter of any suitable or desired character, and it is this printed or decorated surface which ultimately becomes the exterior of each pail or other ultimate product.

Thus it will be seen that a strip of sheet material is fed intermittently, and that the sheet material is operated upon by the blanking press, to form the blanks successively; that each blank is gummed before it is cut off, and that each blank is provided with a handle after it is gummed and before it is cut off or severed from the sheet; and that thereafter the gummed and handled blanks are successively converted into pails or suitable receptacles. In this way the gumming is done by a separate operation, and the handling is done by a separate operation, so that the gumming is done first, while the blank is integral with the sheet, and the handling is done afterward while the blank is still integral with the sheet, but after the gumming operation. There is no gumming operation, therefore, until after the blanks are formed, so that the stock or sheet material passes in ungummed condition from the printing press to the blanking press, and there is no handling operation to apply handles until after the gumming of each blank has been accomplished, and then the gummed and handled blank is severed from the sheet or just before it is converted into a pail or suitable receptacle. One blank is being formed, in the blanking press, therefore, while the previous blank is being gummed, and while the blank ahead of that is being provided with a handle, and while the one still farther ahead at the end of the sheet or strip is being cut off or converted into a pail or suitable receptacle. The blank is gummed by one operation, so that the entire gumming operation is performed while the blank is standing still and not while moving, and before being severed from the sheet, and before being provided with a handle, but for the latter purpose the blank is perforated by the blanking press to receive the ends of the handle.

What I claim as my invention is:

1. In a machine for making receptacles from sheet material, the combination of instrumentalities for applying a handle to a blank, while the blank is integral with the sheet material, means for feeding the blank and its handle forward, while the blank is integral with the sheet material, and mechanism for thereafter folding the blank in a manner to position the handle for use in carrying the receptacle.

2. A structure as specified in claim 1, said instrumentalities comprising means for feeding the tape transversely of the path of travel of the blank, means for cutting off a length of the tape to form the handle, and devices for inserting the end portions of the length of tape through the blank.

3. A structure as specified in claim 1, said instrumentalities comprising means for feeding the material from which the handle is formed, means for cutting off a length of said material, and means for inserting the ends of said length through the blank.

4. A structure as specified in claim 1, said instrumentalities comprising means having movement transversely of the machine to feed a length of the material from which the handle is formed, means for cutting off the desired length of said material, a transverse rock shaft, arms on said rock shaft, devices on the ends of said arms to force the ends of said length of material through the blank, and means for rocking said shaft.

5. A structure as specified in claim 1, and means for applying an adhesive to portions of the blank, whereby to hold the blank in folded condition when finally folded by said mechanism.

6. A structure as specified in claim 1, and means for applying an adhesive to portions of said blank, said instrumentalities comprising devices for feeding a length of tape across the blank, and devices for inserting the ends of said length through the blank, whereby the inserted ends of the handle may thereafter be folded against the blank and held in place by said adhesive.

7. A structure as specified in claim 1, and instrumentalities comprising means for applying an adhesive to not only provide for the holding of the blank in folded condition, when folded by said mechanism, but also to assist in fastening the ends of said handle in place.

8. A structure as specified in claim 1, said forming mechanism comprising devices to fold the ends of the handle in between thicknesses of said blank.

9. A structure as specified in claim 1, said mechanism comprising a vertically movable form upon which the blank is folded, to form the receptacle, devices for engaging different portions of the blank to fold the blank upon said form, movable means to clamp the folded and overlapping side portions of the receptacle tightly together, in combination with means for disengaging the receptacle from said form.

10. A structure as specified in claim 1, said forming mechanism comprising a vertically movable form upon which the blank is folded, stationary devices for engaging different portions of the blank, thereby to fold portions upon each other, to form the receptacle in an upside down position, and laterally movable clamps to press the overlapping side portions of the receptacle tightly together.

11. A structure as specified in claim 1, said feeding means comprising devices for feeding a sheet of material forward, means for blanking said sheet, thereby to form connected blanks, whereby the feeding of the blank from said instrumentalities to said mechanism is accomplished by feeding the sheet, in combination with means between said instrumentalities and said mechanism to cut off the blank to which the handle has been attached, whereby the severed blank with its handle may be formed into a receptacle.

12. A structure as specified in claim 1, said feeding means comprising a blanking press having devices for intermittently feeding a sheet of material, so that the feeding of the blank from said instrumentalities to said mechanism is accomplished by the intermittent forward feeding movement of said sheet, in combination with means between said instrumentalities and said mechanism for cutting off the blank to which the handle has been attached, whereby the severed blank and its handle may then be converted into the desired receptacle.

13. A structure as specified in claim 1, said feeding means comprising a blanking press and printing press, having provisions to feed a sheet of material continuously through the printing press and intermittently through the blanking press, whereby the blank is fed from said instrumentalities to said mechanism by the intermittent feeding motion of the sheet, caused by the feeding motion of the blanking press, notwithstanding the continuous feeding motion of the printing press.

14. A structure as specified in claim 1, said feeding means comprising a blanking press having means for intermittently feeding a sheet of material, thereby to form the sheet into connected blanks, whereby the blank to which the handle has been attached by said instrumentalities is fed forward to the forming mechanism by the intermittent feeding motion of said sheet, whereby said blanking press and said instrumentalities operate each time the sheet is stationary, in combination with means between said instrumentalities and said mechanism to cut off the blank to which the handle has been attached.

15. A structure as specified in claim 1, said instrumentalities comprising means for feeding a length of tape across the blank, and devices for inserting the ends of said length through the blank, said feeding means comprising a blanking press for feeding a sheet of material to form connected blanks, in combination with means between said instrumentalities and said mechanism to cut off the blank to which the handle has been attached.

16. A structure as specified in claim 1, and means for applying an adhesive to portions of the blank, said instrumentalities comprising means for feeding a length of tape across the blank, and devices for inserting the ends of said length through the blank, whereby the end portions of the handle are ultimately held in place by said adhesive, and said feeding means comprising a blanking press for intermittently feeding a sheet of material to form connected blanks, whereby the feeding of the blank from said instrumentalities to said mechanism is caused by the feeding motion of said sheet, in combination with means for cutting off the blank to which the handle has been attached, whereby the severed blank may then be folded by said mechanism to produce the desired receptacle.

17. A structure as specified in claim 1, comprising a blanking press for feeding a sheet of material, thereby to produce connected blanks, whereby the feeding of the blank from said instrumentalities to said mechanism is accomplished by the feeding motion of said sheet, produced by the feeding motion of said blanking press, said machine having means for applying an adhesive to one surface of the blank, and said instrumentalities comprising means for feeding a length of tape across the other surface of the blank, together with devices for inserting the ends of said length through the blank, said blanking press and said instrumentalities being timed to operate each time the sheet is stationary.

18. A structure as specified in claim 1, said mechanism being operative to fold portions of the blank upon other portions, to form two-ply side walls for the receptacle, with the ends of the handle held between the two thicknesses of each side wall.

19. A structure as specified in claim 1, said mechanism comprising a form upon which the blank is folded in a manner to form an upside down receptacle thereon, with the portions of the handle squeezed in between thicknesses of the blank, and said machine having means for applying an adhesive to the opposing surfaces of the thicknesses between which the ends of the handle are held.

20. A structure as specified in claim 1, said machine having means below for applying an adhesive to the under surface of certain portions of the blank, and said instrumentalities comprising means for feeding a length of tape across the upper surface of the blank and means for inserting the end portions of said length downwardly through slots formed in the portions of the blank to which said adhesive is applied.

21. In a machine for operating upon sheet material, the combination of devices for puncturing the sheet material, means for feeding a length of flexible material across the sheet material, devices for inserting the flexible material through the apertures made in the sheet material, and instrumentalities cooperating to sever the punctured section with flexible material inserted therein from the sheet of material.

22. A structure as specified in claim 21, in combination with means for gumming the sheet material prior to the attachment of the length of flexible material thereto, and mechanism for thereafter folding the sheet material and providing a receptacle having a handle formed by said length of flexible material.

23. A structure as specified in claim 21, in combination with means for cutting the said flexible material so that this flexible material may be fed intermittently and cut off in successive lengths.

24. A structure as specified in claim 21, in combination with mechanism for folding the sheet material to form a receptacle having a handle formed by said length of flexible material.

25. A structure as specified in claim 21, said means for feeding the flexible material comprising a pair of jaws to grip the end of the length, and instrumentalities causing said jaws to reciprocate transversely of the machine.

26. A structure as specified in claim 21, said devices for puncturing the sheet material being adapted to form two openings a distance apart, and said devices for inserting the flexible material comprising two fingers placed a distance apart to engage the end portions of the length of flexible material, so that these end portions are inserted in the two openings in the piece of sheet material, thereafter to form a handle for the ultimate product.

27. In receptacle forming mechanism, the combination of a plunger movable upward against the underside of a blank to be folded, depending stationary portions to engage two sections of the blank, other portions to engage other sections of the blank, other stationary portions to engage two other sections of the blank, as the plunger moves upward, guards to hold the folded side portions of the receptacle in place, and devices acting upon said folded portions to fasten them together.

28. A structure as specified in claim 27, said devices comprising clamping jaws for compressing the overlapping side portions of the receptacle, in combination with means to previously apply an adhesive to the blank, so that the pressure of said devices will fasten the overlapping portions together.

29. A structure as specified in claim 27, in combination with automatic means to lift the completed receptacle out of said forming mechanism, to discharge the product from the machine.

30. In a machine for making receptacles, the combination of means including a blanking press for blanking a strip of paper and feeding the same forward, and instrumentalities for applying adhesive to the connected blanks, successively, so that each blank is gummed after being formed, in combination with means thereafter to successively cut off and fold the formed and gummed blanks to form receptacles.

31. A structure as specified in claim 30, in combination with means for applying a handle to each blank before it is folded.

32. A structure as specified in claim 30, said blanking press having means for providing each blank with spaced apertures, and means being provided for inserting a handle in said apertures before the blank is folded.

33. In a machine for printing and blanking and converting a strip of sheet material into receptacles, the combination of a printing press, a blanking press, instrumentalities for converting the blanks into receptacles, devices between the blanking press and said instrumentalities to gum and handle the blank, a driving mechanism associated with the blanking press, power transmitting instrumentalities for communicating power from said driving mechanism to the printing press, power transmitting means for communicating power from said driving mechanism to the blanking press, and power transmitting instrumentalities operated by the driving means of the blanking press to operate said devices and said instrumentalities.

34. A structure as specified in claim 33, in combination with a feed mechanism for the blanking press, to intermittently feed the strip of paper or sheet material, and a power transmitting connection between said feed mechanism and the said transmission from the driving mechanism to the printing press.

35. A structure as specified in claim 33, comprising continuous feed mechanism for the printing press, and intermittent feed mechanism for the blanking press, whereby the blanks while connected together are fed intermittently to the instrumentalities for converting them into receptacles.

36. In machinery for converting sheet material into receptacles, the combination of a printing press and a blanking press for printing and blanking a strip of sheet material, having provisions for feeding the blanks intermittently from the blanking press, instrumentalities for successively attaching handles to the blanks, while the blanks are still connected together, means for severing the end blank to which a handle has been attached, from the end of the strip, and mechanism for converting each blank when severed into a receptacle having the exterior thereof formed by the printed surface of the blank.

37. In a machine for converting a strip of material into receptacles, the combination of a blanking press, instrumentalities for applying handles to the blanks and converting them into receptacles, a transverse shaft between said blanking press and said instrumentalities, means on said shaft for operating all of the operative elements of said instrumentalities, driving mechanism for said blanking press, and power transmitting means whereby operation of the blanking press serves to rotate said shaft to operate said instrumentalities.

38. The method of producing receptacles from sheet material, comprising the formation of a blank from said material, attaching a handle to said blank, while the blank is still integral with the sheet material, thereafter severing the blank from the sheet, and thereafter folding the blank to form the desired receptacle.

39. A method as specified in claim 38, including the puncturing of the blank during the making thereof, and the said step of applying the handle comprising the cutting of a strip of tape and the insertion of the ends thereof through the punctures formed in the blank.

40. A method as specified in claim 38, including the gumming of the blank before the handle is applied, and said folding of the blank involving the use of adhesive to secure the end portions of the handle between thicknesses of the blank.

41. In a machine for making receptacles, the combination of instrumentalities for applying a handle to a blank, means for feeding the blank forward, and mechanism for folding the blank in a manner to position the handle crosswise of the top of the receptacle, said instrumentalities comprising means having movement transversely of the machine to feed a length of the material from which the handle is formed, means for cutting off the desired length of said material, a transverse rock shaft, arms on said rock shaft, devices on the ends of said arms to force the ends of said length of material through the blank, and means for rocking said shaft.

42. In a machine for making receptacles, the combination of instrumentalities for applying a handle to a blank, means for feeding the blank forward, and mechanism for folding the blank in a manner to position the handle crosswise of the top of the receptacle, said mechanism comprising a vertically movable form upon which the blank is folded, to form the receptacle, devices for engaging different portions of the blank to fold the blank upon said form, movable means to clamp the folded and overlapping side portions of the receptacle tightly together, in combination with means for disengaging the receptacle from said form.

43. In a machine for making receptacles, the combination of instrumentalities for feeding the blank forward, and mechanism for folding the blank in a manner to position the handle crosswise of the top of the receptacle, said forming mechanism comprising a vertically movable form upon which the blank is folded, stationary devices for engaging different portions of the blank, thereby to fold portions upon each other, to form the receptacle in an upside down position, and laterally movable clamps to press the overlapping side portions of the receptacle tightly together.

44. In a machine for making receptacles, the combination of instrumentalities for applying a handle to a blank, means for feeding the blank forward, and mechanism for folding the blank in a manner to position the handle crosswise of the top of the receptacle, said feeding means comprising devices for feeding a sheet of material forward, means for blanking said sheet, thereby to form connected blanks, whereby the feeding of the blank from said instrumentalities to said mechanism is accomplished by feeding the sheet, in combination with means between said instrumentalities and said mechanism to cut off the blank to which the handle has been attached, whereby the severed blank with its handle may be formed into a receptacle.

45. In a machine for making receptacles, the combination of instrumentalities for applying a handle to a blank, means for feeding the blank forward, and mechanism for folding the blank in a manner to position the handle crosswise of the top of the receptacle, said feeding means comprising a blanking press having devices for intermittently feeding a sheet of material, so that the feeding of the blank from said instrumentalities to said mechanism is accomplished by the intermittent forward feeding movement of said sheet, in combination with means between said instrumentalities and said mechanism for cutting off the blank to which the handle has been attached, whereby the severed blank and its handle may then be converted into the desired receptacle.

46. In a machine for making receptacles, the combination of instrumentalities for applying a handle to a blank, means for feeding the blank forward, and mechanism for folding the blank in a manner to position the handle crosswise of the top of the receptacle, said feeding means comprising a blanking press and printing press, having provisions to feed a sheet of material continuously through the printing press and intermittently through the blanking press, whereby the blank is fed from said instrumentalities to said mechanism by the intermittent feeding motion of the sheet, caused by the feeding motion of the blanking press, notwithstanding the continuous feeding motion of the printing press.

47. In a machine for making receptacles, the combination of instrumentalities for applying a handle to a blank, means for feeding the blank forward, and mechanism for folding the blank in a manner to position the handle crosswise of the top of the receptacle, said feeding means comprising a blanking press having means for intermittently feeding a sheet of material, thereby to form the sheet into connected blanks, whereby the blank to which the handle has been attached by said instrumentalities is fed forward to the forming mechanism by the intermittent feeding motion of said sheet, whereby said blanking press and said instrumentalities operate each time the sheet is stationary, in combination with means between said instrumentalities and said mechanism to cut off the blank to which the handle has been attached.

48. In a machine for making receptacles, the combination of instrumentalities for applying a handle to a blank, means for feeding the blank forward, and mechanism for folding the blank in a manner to position the handle crosswise of the top of the receptacle, said instrumentalities comprising means for feeding a length of tape across the blank, and devices for inserting the ends of said length through the blank, said feeding means comprising a blanking press for feeding a sheet of material to form connected blanks, in combination with means between said instrumentalities and said mechanism to cut off the blank to which the handle has been attached.

49. In a machine for making receptacles, the combination of instrumentalities for applying a handle to a blank, means for feeding the blank forward, and mechanism for folding the blank in a manner to position the handle crosswise of the top of the receptacle, and means for applying an adhesive to portions of the blank, said instrumentalities comprising means for feeding a length of tape across the blank, and devices for inserting the ends of said length through the blank, whereby the end portions of the handle are ultimately held in place by said adhesive, and said feeding means comprising a blanking press for intermittently feeding a sheet of material to form connected blanks, whereby the feeding of the blank from said instrumentalities to said mechanism is caused by the feeding motion of said sheet, in combination with means for cutting off the blank to which the handle has been attached, whereby the severed blank may then be folded by said mechanism to produce the desired receptacle.

50. In a machine for making receptacles, the combination of instrumentalities for applying a handle to a blank, means for feeding the blank forward, and mechanism for folding the blank in a manner to position the handle crosswise of the top of the receptacle, said mechanism comprising a form upon which the blank is folded in a manner to form an upside down receptacle thereon, with the portions of the handle squeezed in between thicknesses of the blank, and said machine having means for applying an adhesive to the opposing surfaces of the thicknesses between which the ends of the handle are held.

51. In a machine for making receptacles, the combination of means including a blanking press for blanking a strip of paper and feeding the same forward, and instrumentalities for applying adhesive to the connected blanks, successively, in combination with means thereafter to cut off and fold the gummed blanks to form receptacles, in combination with means for applying a handle to each blank before it is folded.

52. In a machine for making receptacles, the combination of means including a blanking press for blanking a strip of paper and feeding the same forward, and instrumentalities for applying adhesive to the connected blanks, successively, in combination with means thereafter to cut off and fold the gummed blanks to form receptacles, said blanking press having means for providing each blank with spaced apertures, and means being provided for inserting a handle in said apertures before the blank is folded.

53. In a machine for printing and blanking and converting a strip of sheet material into receptacles, the combination of a printing press, a blanking press, instrumentalities for converting the blanks into receptacles, a driving mechanism associated with the blanking press, power transmitting instrumentalities for communicating power from said driving mechanism to the printing press, power transmitting means for communicating power from said driving mechanism to the blanking press, and power transmitting instrumentalities operated by the driving means of the blanking press to operate said instrumentalities by which the blanks are ultimately converted into receptacles, in combination with a feed mechanism for the blanking press, to intermittently feed the strip of paper or sheet material, and a power transmitting connection between said feed mechanism and the said transmission from the driving mechanism to the printing press.

54. In a machine for printing and blanking and converting a strip of sheet material into receptacles, the combination of a printing press, a blanking press, instrumentalities for converting the blanks into receptacles, a driving mechanism associated with the blanking press, power transmitting instrumentalities for communicating power from said driving mechanism to the printing press, power transmitting means for communicating power from said driving mechanism to the blanking press, and power transmitting instrumentalities operated by the driving means of the blanking press to operate said instrumentalities by which the blanks are ultimately converted into receptacles, comprising continuous feed mechanism for the printing press, and intermittent feed mechanism for the blanking press, whereby the blanks while connected together are fed intermittently to the instrumentalities for converting them into receptacles.

EDWARD CRAIG.